United States Patent Office 3,338,351
Patented Aug. 29, 1967

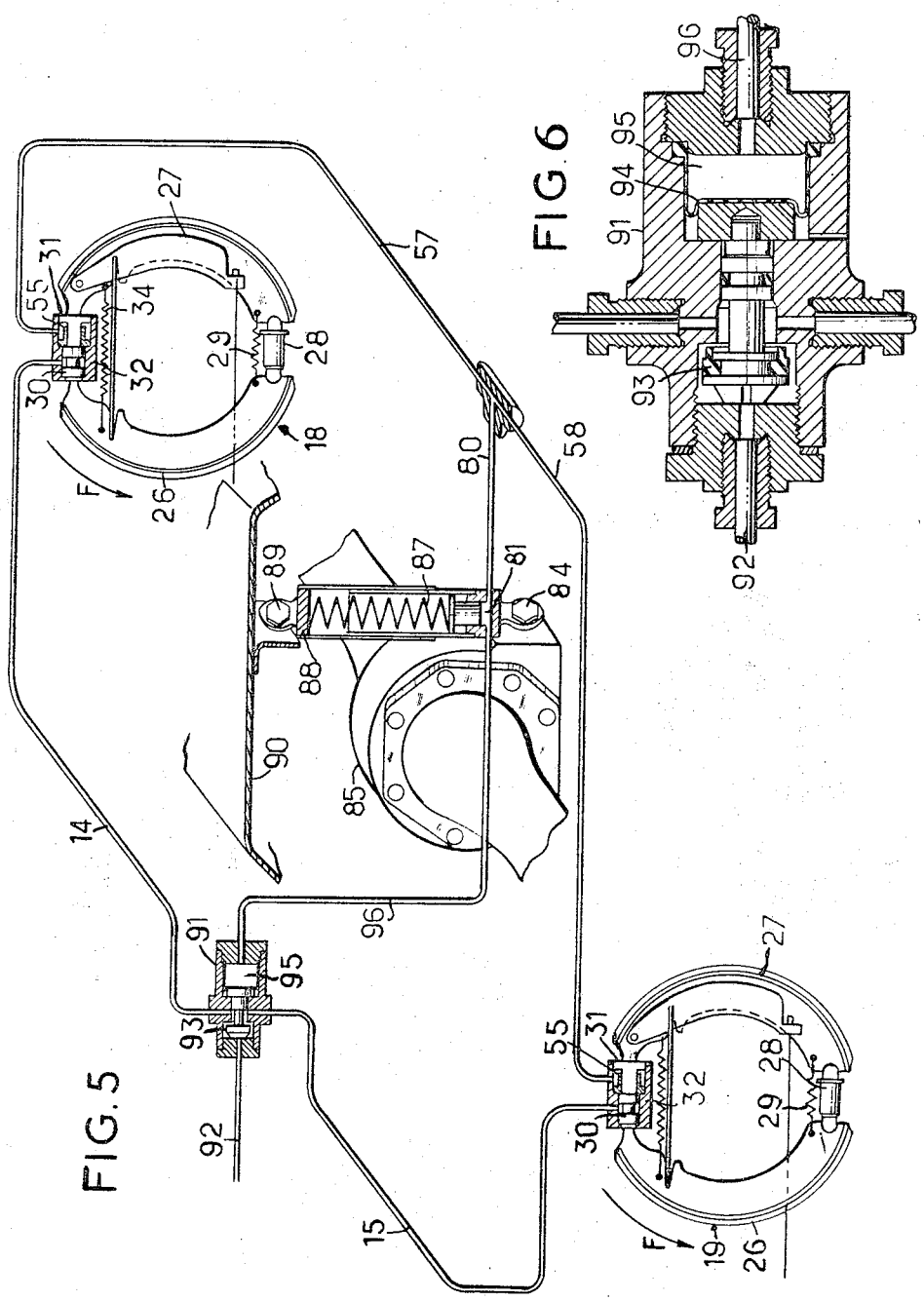

3,338,351
DRUM BRAKE, ITS METHOD OF OPERATION AND ITS APPLICATION
Pierre André Georges Lepelletier, Chatou, France, assignor to Societe Anonyme Francaise Du Ferodo, a corporation of France
Filed May 6, 1965, Ser. No. 453,799
Claims priority, application France, May 11, 1964, 973,936
5 Claims. (Cl. 188—195)

The present application is a continuation in part of my copending application Serial Number 427,673 filed on January 25, 1965.

The present invention relates to drum brakes, in particular to the rear brakes of a hydraulic braking system of an automobile vehicle, and more especially to such brakes which comprise two shoes each pivoted to be forced against the drum, at least one cylinder having pistons respectively applied to the extremities of the shoes to force them apart, and elastic restoring means urging the extremities of the shoes closer to each other.

During braking, the weight of the vehicle is transferred towards the front, which makes it necessary to provide a less effective braking at the rear than at the front, in order to prevent the rear wheels from being locked, which is liable to cause a bad skid.

In the conventional rear brake constructions this reduced effectiveness imposed by conditions of stability during hard braking, is maintained irrespective of the degree of braking. During normal braking, this results in a reduced total braking capacity, and in addition, in more severe working conditions of the front brakes which may be subjected to considerable heating especially when driving in towns where numerous braking actions are necessary. For this reason, the front brakes are less capable of giving a more intense braking effect if this is needed.

The main object of the present invention is to provide an automotive vehicle drum brake, especially a rear brake of an automobile vehicle employing hydraulic cylinder means to apply the shoes against the drum in which the aforesaid drawbacks are minimized or eliminated.

The particular environment of the present invention is that of the above-identified copending application, in which at least two phases of braking different from each other are provided, a phase of great effectiveness coming first into action, in which the hydraulic cylinder means tend to cause the shoes to rotate in the same direction as the drum, that is to say with a self-locking action, and a phase of moderate effectiveness following subsequently, in which the hydraulic cylinder means tend to cause the shoe to rotate in the opposite direction to the drum, that is to say with a self-releasing action. By virtue of this arrangement, the rear brakes are made very effective during easy braking or at the beginning of hard braking, that is to say when there is no danger of locking the rear wheels, and have a moderate effectiveness when the braking is accentuated, so as to prevent locking. Thus, the total braking capacity is increased, and during driving in towns, when repeated slight braking actions are taken, the rear brakes relieve the work of the front brakes, which remain cold and are thus particularly able to provide a very hard braking, should the need arise.

The present invention particularly aims to provide a braking system of the kind specified hereinabove, in which the point of transition between the two braking stages varies as a function of one or more factors determined by the whole or part load of the vehicle.

In order that the invention may be more fully understood embodiments in accordance therewith will now be described by way of example, with reference to the accompanying drawings, in which:

FIG. 5 is a partial diagram of another automotive vehicle braking system; and

FIG. 6 is a longitudinal cross section on an enlarged scale of the pressure limiter of FIG. 5.

Figure 1:
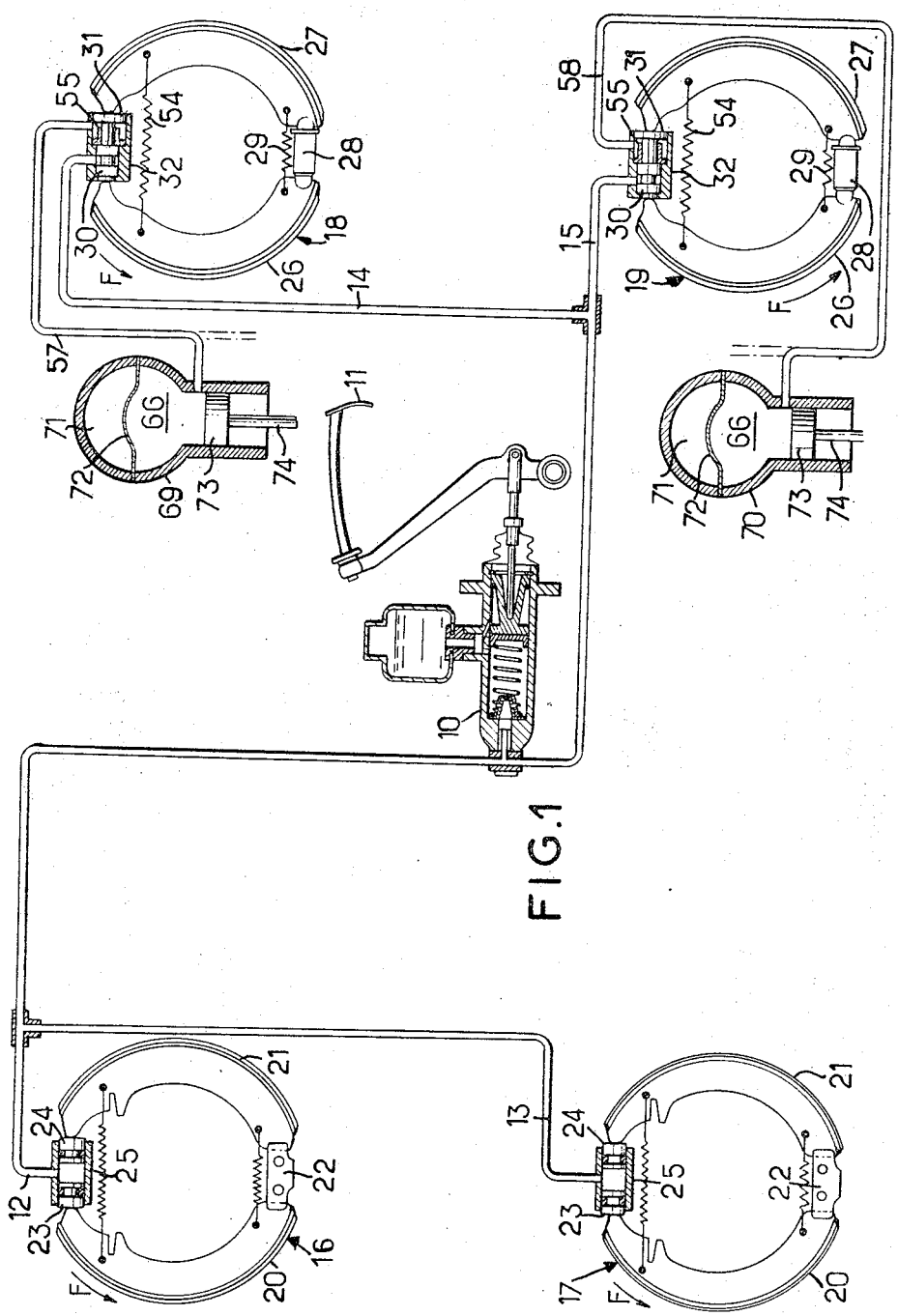
FIG. 1 is a diagram of an automotive vehicle braking system.

Referring to FIG. 1 a master-cylinder 10 when operated by a brake actuating pedal 11 forces oil through conduits 12, 13, 14, 15 which respectively feed the off-side front brake 16, the near-side front brake 17, the off-side rear brake 18, and the near-side rear brake 19 of an automotive vehicle.

The front brakes 16 and 17 are of the drum type for example, each comprising two shoes 20 and 21 applied at one extremity against a fixed support 22, and at the other extremity against pistons 23, 24 of a cylinder 25 supplied with pressure fluid through the conduit 12 and 13 respectively.

Each rear brake 18, 19 comprises two shoes 26 and 27 applied at one extremity against a link rod 28 which is not fixed and is free to perform a circumferential motion as a unit with the shoes 26 and 27, the shoes 26 and 27 being held against the link rod 28 by a spring 29.

At their other extremity, the shoes 26 and 27 are respectively engaged against a primary piston 30 and a secondary piston 31 of a cylinder 32. The construction of the cylinder 32 is shown in greater detail in FIG. 2, in which the cylinder 32 has an actuation chamber or bore 33 of small diameter in which the piston 30, having a sealing ring 34, is slidingly mounted, and a modulating chamber or bore 35 of larger diameter than the bore 33, in which a piston 31 having a sealing ring 36 is slidingly mounted. The bores 33 and 35 are separated by a sealing seat or shoulder 37.

The small piston 30 has a flange 38 which extends into an enlarged bore 39 forming an extension of the bore 33. The flange 38 may be displaced between two abutments respectively formed on one side by a shoulder 40 separating the bores 33 and 39, and on the other side by a spring clip 41 or the like, engaged in the bore 39, which limits the stroke of the primary piston 30.

In the bore 33 is also engaged a second piston 42 having a sealing ring 43. The end 44 of the piston 42 is caused to abut against the end of the piston 30 and is peripherally cut back or recessed to form a primary actuation chamber 45 in the bore 33. This chamber is defined between the two joints 34 and 43 and is connected to the conduit 14 or 15.

When the flange 38 abuts against the shoulder 40 and the pistons 30 and 42 abut against each other, a shoulder 46 on the piston 42, remote from the end 44, is disposed in the same plane as the shoulder 37.

The piston 31 has a shank 47 on the end of which is screwed a nut 48 solid with the piston 42. Around the shank 47 is engaged a sealing seat 49, 50 comprising a ring 49 and a flange 50 surrounding the nut 48. The ring 49 slides along the shank 47 whereas the flange 50 slides in the bore 39. A sealing ring 51 is interposed between the ring 49 and the shank 47, whereas a sealing ring 52 is interposed between the flange 50 and the bore 39. The flange 50 is shaped to abut against the shoulder 46 of the piston 42 as well as against the fixed shoulder 37, whereas the ring 49 is shaped to abut at 53 against the nut 48.

Elastic return devices urge the extremities of the shoes 26 and 27 adjacent to the cylinder 32 towards each other, and thus keep these extremities firmly applied against the pistons 30 and 31. These elastic devices may as shown comprise a spring 54 yoked between the shoes as in FIG. 1, or preferably two springs, one yoked to the shoe 26 and weaker than the other which is yoked to the shoe 27.

A secondary modulation chamber 55 is defined within the bore 35 by the sealing rings 36, 51 and 52 and is filled with oil.

The chamber 55 of the off-side rear brake 18 (FIG. 1) is connected to a conduit 57, whereas the chamber 55 of the near-side brake is connected to a conduit 58.

In the construction shown the automotive vehicle is of the fluid suspension type and comprises suspension spheres 69 and 70 respectively associated with the off-side rear road wheel and the near-side rear road wheel. Each suspension sphere is secured to the chassis and comprises an oil space 66 and an air space 71 which are separated from each other by a flexible diaphragm 72. The oil space 66 is defined within the sphere between the diaphragm 72 and a piston 73 whose rod 74 is connected to a suspension lever connecting the road wheel to the chassis.

The conduits 57 and 58 are respectively connected to the spaces 66 of the spheres 69 and 70. The pressure within the spaces 66 rises in proportion to the load of the vehicle. Owing to this fact, the pressure within the chambers 55 itself rises in proportion with the load of the vehicle, specifically that on the rear axle.

Figure 2:
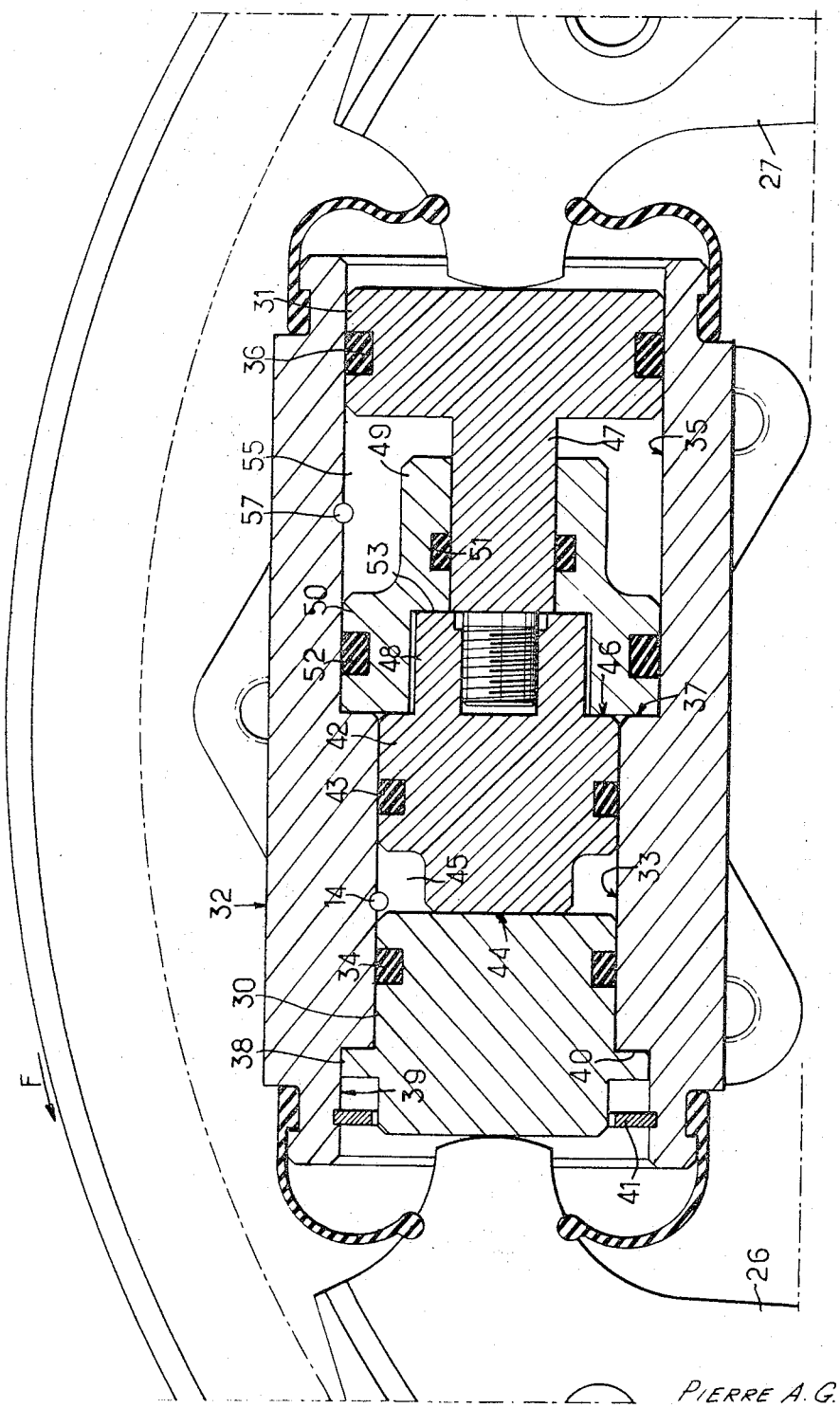
FIG. 2 is a longitudinal cross section on an enlarged scale of a part of a rear brake of the system of FIG. 1.

When the brake pedal 11 is released, the device occupies the position shown in FIG. 2, in which the piston 30 is in abutment with its flange 38 against the shoulder 40, whereas the piston 42 is in abutment against the piston 30, the ring 49 itself being in abutment at 53 against the nut 48 and having its flange 50 in abutment against the shoulder 37 as well as against the extremity 46 of the piston 42.

When the brake pedal 11 is depressed for braking purposes, oil is expelled from the master-cylinder 10 through the conduits 12, 13 into the brake cylinders 25 of the front brakes 16 and 17, and through the conduits 14, 15 into the primary actuation chambers 45 of the rear brakes 18 and 19.

The front brakes 16 and 17 of conventional construction, operate with the shoe 20 under compression and the shoe 21 in tension, when the braking action is performed in forward motion (i.e. in the direction of the arrow F, FIG. 1), which assures an appropriate degree of self-tightening.

When the pressure reaches the chamber 45 of each rear brake, this pressure tends to displace the piston 30 towards the left of FIG. 2. The displacement of the piston 30 towards the left firstly causes the shoes 26 and 27 to be brought into contact with the drum, which condition is established when the flange 38 of the piston 30 is situated approximately halfway between the stops 40 and 41.

When the shoes 26 and 27 are in contact with the drum, the forces applied to the group of components 42, 47, 31, 49 are as follows. Towards the right in FIG. 2, the pressure engendered in the chamber 45 multiplied by the cross sectional area of the piston 42, plus the pressure in the chamber 55 multiplied by the difference between the cross sectional areas of the piston 31 and of the shank 47, and towards the left in FIG. 2, the force in the extremity of the shoe 27, resulting from the turning effect of the shoes 26 and 27 in contact with the drum, which force is a multiple of the force exerted on the piston 30 by the pressure in the chamber 45.

For as long as the force towards the right is not exceeded by the force towards the left, the components 42, 47, 31, 49 continue to occupy the inoperative position shown in FIG. 2, the piston 30 continuing to occupy a position in which the flange 38 is substantially halfway between the stops 40 and 41.

The braking action during this initial stage is very effective with a high degree of self-tightening, more powerful than that obtained on the front brakes 16, 17, since the two shoes 26, 27 are in compression, whereas only one shoe in two, or say the shoe 20, is in compression in the front brakes. The braking action during this initial stage is limited by the pressure in the chamber 55, that is to say as a function of the load of the vehicle.

In step with the rise in the operating pressure in the chamber 45, the force towards the left increases more quickly than the force towards the right, and an instant is reached at which the two forces are balanced, and after which the force towards the left exceeds the force towards the right.

The pistons 31 and 42 thereupon move towards the left, whereas owing to the corresponding circular displacement of the shoes 26 and 27, the piston 30 is made to move towards the left.

It will be noted that during these displacements, the flange 50 of the ring 49 remains in abutment against the shoulder 37.

When the flange 38 of the piston 30 comes into abutment against the clip 41, the piston 30 is prevented from continuing its displacement towards the left of FIG. 2, and the increase of pressure in 45 thereupon has the result of repelling the assembly 42, 47, 31, 50 towards the right of FIG. 2.

From this moment, a second braking stage commences, in which the rear brakes operate with a self-releasing characteristic, that is to say with very satisfactory balancing.

In other words, the rear brakes are very effective during a light braking action on the pedal 11 or at the beginning of heavy braking action, and operate more moderately, that is to say without danger of locking when the braking action is being intensified.

It will equally be noted that the transition between the two stages which depends on the pressure within the chamber 55 varies as a function of the load of the vehicle, since the conduits 57 and 58 are connected to the spaces 66 of the suspension spheres 69 and 70.

Figure 3:
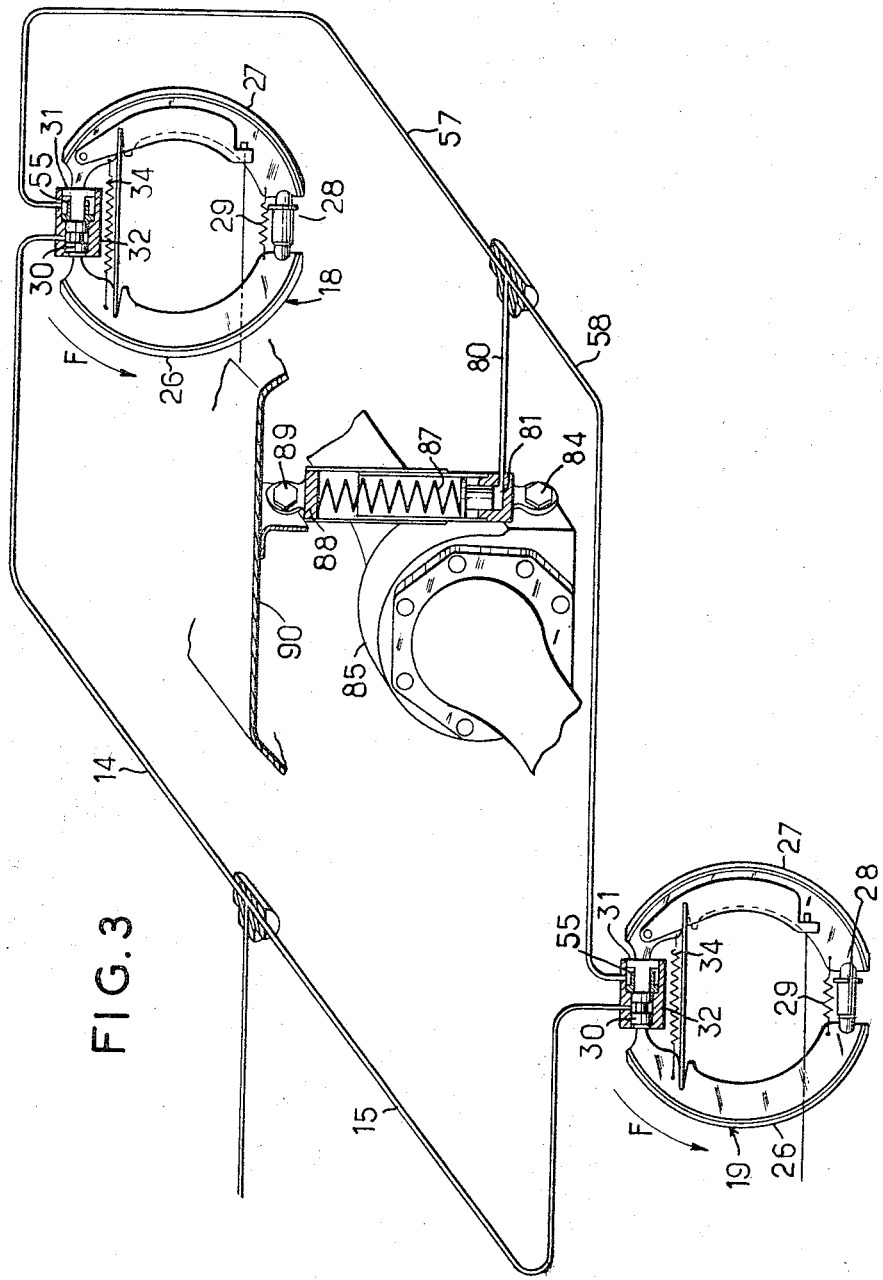
FIG. 3 is a partial diagram of a second automotive vehicle braking system.
Figure 4:
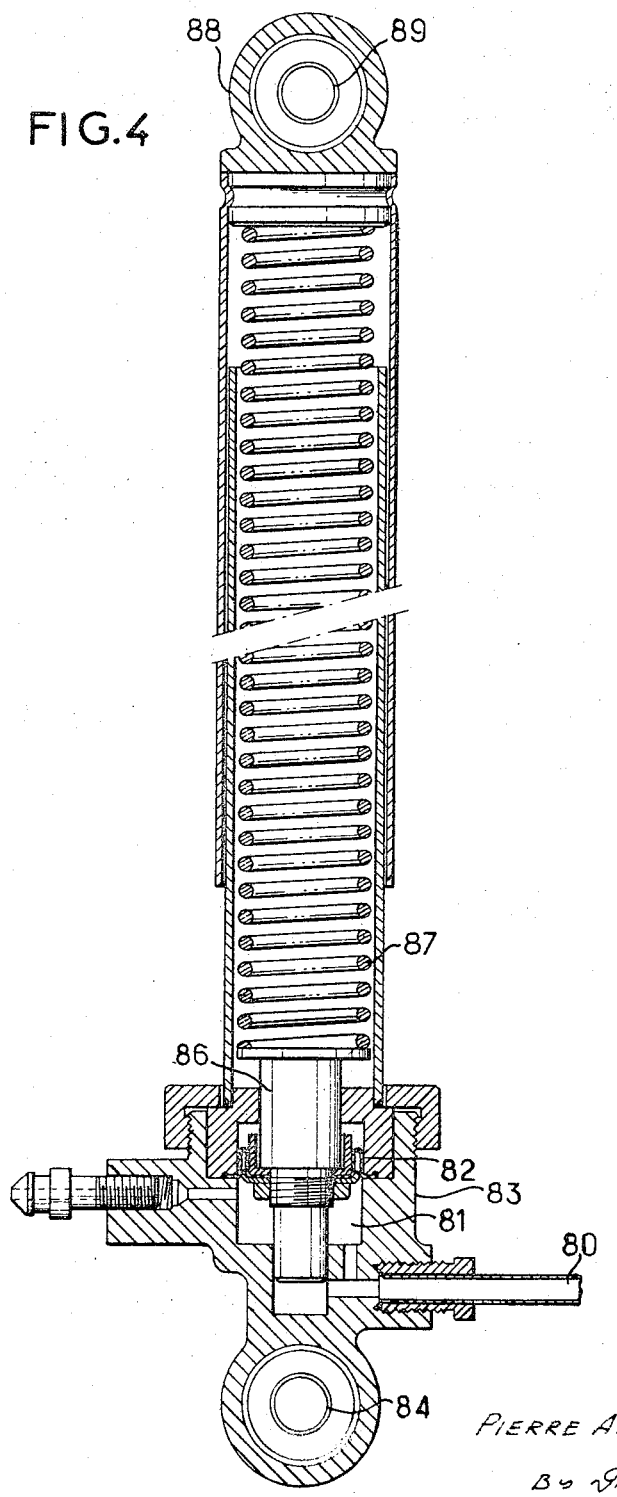
FIG. 4 is a longitudinal cross section on an enlarged scale of the suspension tube of FIG. 3 comprising a spring and a fluid buffer.

Referring to FIGS. 3 and 4 the construction therein is analogous to that which has been described with reference to FIGS. 1 and 2, but conduits 57 and 58, instead of being connected to the spheres 69, 70 of a fluid suspension system, are connected to a conduit 80 (FIGS. 3 and 4) which is connected to a chamber 81 bounded by a diaphragm 82 in a block 83 secured at 84 to the rear axle 85. The chamber 81 forms a liquid buffer. The diaphragm 82 is linked to a displaceable element 86 which is itself linked by a spring 87 to an element 88 secured at 89 to the chassis 90 of the vehicle.

To a greater or lesser extent, the spring 87 contributes to the rear suspension of the vehicle.

The pressure in the chamber 81 and consequently in the chambers 55, depends on the load of the vehicle. As previously, the point of transition between the two braking stages thus varies as a function of the load of the vehicle.

The construction shown in FIGS. 5 and 6, is similar to that in FIGS. 4 and 5 but a pressure limiter 91 is interposed between the conduits 14 and 15 and a conduit 92 connected to the master-cylinder 10. The limiter 91 comprises a valve 93 which senses the pressure in the conduit 92 and which interrupts communication between this conduit 92 and the conduits 14 and 15 when this pressure exceeds a definite limit which is normally set by means of a spring. This spring is omitted in this case, and is replaced by a diaphragm 94 solid with the valve 93 and adjacent to a hydraulic chamber 95. This chamber 95 is connected by a conduit 96 to the chamber 81 whose pressure depends on the load of the vehicle. In FIGS. 5 and 6, the load of the vehicle thus exerts an influence not only on the point of transition between the two braking stages, but equally on the closing point of the valve 93 of the pressure limiter.

A spring could be incorporated in the chamber 55 and could act between the sealing seat 50 and the piston 31 to add its action to that of the pressure in the chamber 55.

I claim:

1. An automotive vehicle brake system, comprising two front brakes and two rear brakes, means for supplying fluid under pressure to all said brakes, each of said rear brakes comprising a rotatable drum rigid in rotation with a vehicle wheel, interconnected first and second brake shoes floatingly disposed within said drum and adapted to be frictionally applied thereto, elastic restoring means for disengaging the shoes from the drum, a stationary hydraulic cylinder, a first piston and a second piston slidingly disposed in the cylinder and bearing against the first and second shoes, respectively, the cylinder having an actuating chamber therein between the first and second pistons so that pressure in the actuating chamber urges the first piston in one direction and the second piston in the opposite direction, the cylinder having a modulating chamber therein such that pressure in the modulating chamber urges the second piston in said opposite direction, said fluid supply means including means for selectively applying fluid pressure to said actuating chamber, said first piston being responsive to a first relatively low pressure in said actuating chamber to move said shoes relative to said drum in a direction such that the leading portion of each shoe is more firmly engaged with the drum than is the trailing portion of each shoe with respect to the direction of rotation of the drum, said second piston being responsive to a second relatively high pressure in said actuating chamber to release said leading portion of at least one said shoe from said firmer engagement, and means responsive to at least a portion of the weight of the vehicle to apply continuously to the modulating chamber fluid at a pressure that varies with the weight of the vehicle.

2. An automotive vehicle brake system as claimed in claim 1, and valve means for interrupting the supply of fluid under pressure to said two front brakes, said means responsive to at least a portion of the weight of the vehicle also applying to said valve means fluid at a pressure that varies with the weight of the vehicle so as to urge said valve means toward open position against the pressure of the front brake fluid supply thereby to limit the fluid pressure in the front wheel brakes according to the weight of the vehicle.

3. An automotive vehicle brake system as claimed in claim 1 incorporated in a vehicle having a chassis and axle means interconnecting the rear wheels, said responsive means being disposed and acting between the chassis and the axle means.

4. A vehicle brake system as claimed in claim 3, said responsive means comprising a cylinder having a chamber in fluid communication with said modulating chambers, and a piston slidable in said last-named chamber and urged by the weight of the vehicle in a direction to decrease the size of said last-named chamber.

5. A vehicle brake system as claimed in claim 4, and spring means for transmitting to said last-named piston a portion of the weight of the vehicle.

References Cited

UNITED STATES PATENTS

| 2,270,366 | 1/1942 | Wolf | 188—195 |
| 2,657,774 | 11/1953 | Perrot | 188—195 |
| 3,044,581 | 7/1962 | Lepelletier | 188—152 |
| 3,137,370 | 6/1964 | Lepelletier | 188—152 |

DUANE A. REGER, *Primary Examiner.*